Dec. 7, 1965     T. A. ROZSA ETAL     3,222,183
SORGHUM GENUS FLOUR FRACTIONATION PROCESS
Filed Feb. 11, 1963
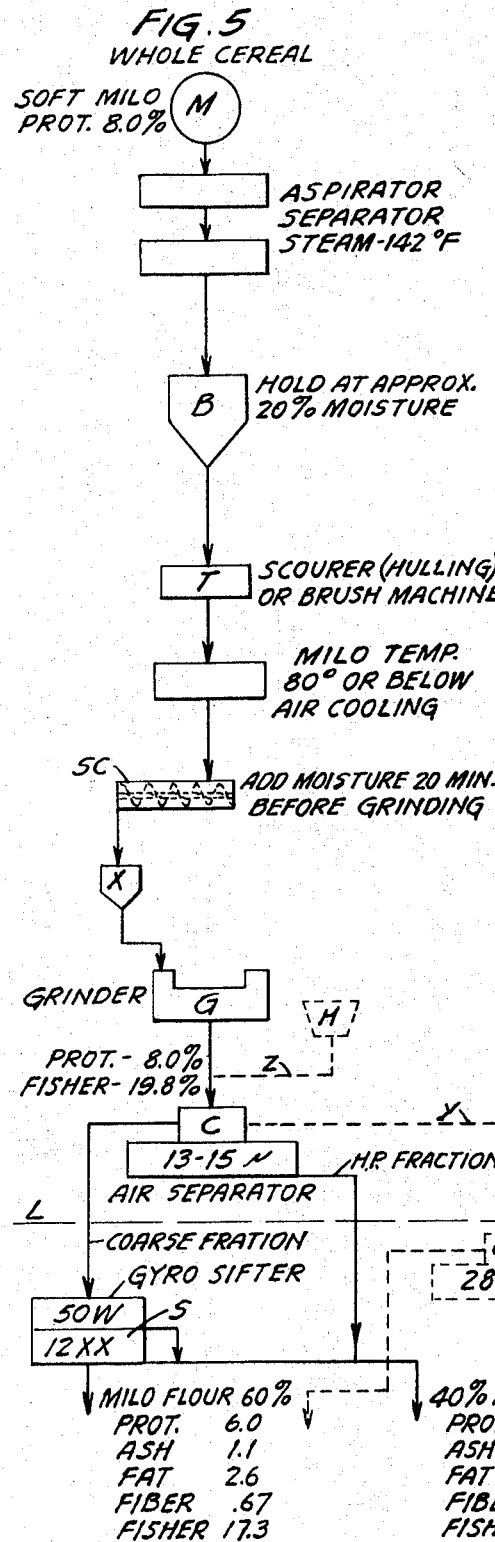
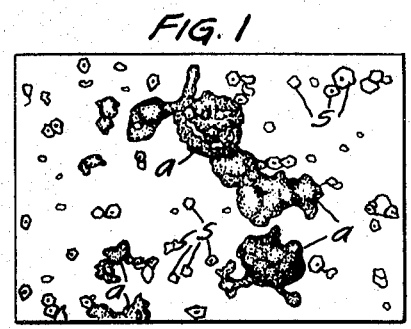
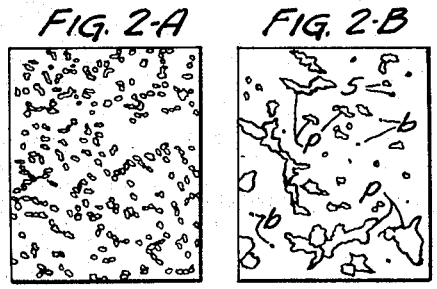
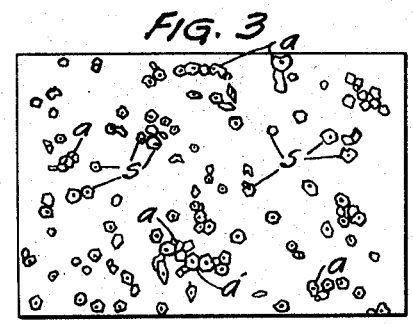
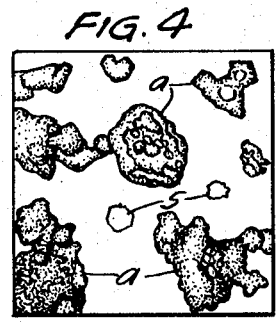
INVENTORS
TIBOR A. ROZSA
REZSOE GRACZA
WILLIAM TRUMAN MANNING
CHASTAIN G. HARREL
BY *Williamson & Palmatier*
ATTORNEYS United States Patent Office 3,222,183
Patented Dec. 7, 1965

3,222,183
SORGHUM GENUS FLOUR FRACTIONATION
PROCESS
Tibor A. Rozsa, Rezsoe Gracza, William Truman Manning, and Chastain G. Harrel, Minneapolis, Minn., assignors to The Pillsbury Company, Minneapolis, Minn., a corporation of Delaware
Filed Feb. 11, 1963, Ser. No. 257,517
8 Claims. (Cl. 99—93)

Our invention relates to the fractionation and treatment of cereal flours and whole grain cereals with the attendant production, commercially and economically of one or more new products having substantially different physical and chemical characteristics from the parent flour or whole grain and from any products of the prior art.

The instant application relates to methods and products in that broad class of cereal grains commonly referred to as corn and to that genus of general corn classification known as sorghum, and including milo.

The earlier applications identified herein disclose basic classification steps and ranges of discovered critical cuts which inherently produce from a large number of cereal grains, a substantial shifting of protein in the fractions and products obtained. Stated another way said original applications disclosed fractionation by critical air separations of heterogeneous parent cereal particles into fractions or products which contain the natural physical and chemical constituents in a relatively concentrated state.

The instant invention, while employing the general ranges and steps of our previous disclosures, adds important specific discoveries particularly applicable to the fractionation of grains and flours of the sorghum genus including milo, resulting commercially and economically in high-yield production of low protein, premium milo and other sorghum genus flours, substantially free of the shreds of the protein matrix and bran fragments which are prevalent after intense grinding and which protein shreds carry and contain the larger proportions of the fat in the original parent stock. The particles of this new and highly desirable product are quite substantially uniform in size and shape and predominantly consist in discrete poly hedral starch granules in contrast to the ellipsoid shape of wheat and rye starch granules.

Such a product is particularly well and economically adapted for extensive industrial use, including binding and filler materials, and sizing in the manufacture of commercial papers, wallboard, plastic board, corrugated box stock and acoustical tile, and also well adapted for textile sizing and adhesives. This new product also is valuable and well suited for certain food uses such as replacements for tapioca flour and cornstarch in puddings, fillers for various pies and salad dressing, and an ingredient for prepared mixes like pancake flour.

The morphology of milo and other grains of the sorghum genus while generally similar to that of American corn as well as wheat, rye and barley, has certain characteristics which heretofore, to the best of our konwledge, have prevented commercial production of a low protein fraction free of the inherent bran fragments, fiber and the discrete shreds of the protein matrix. The discrete starch granules of milo produced in the heterogeneous mixture after any type of grinding, are smaller in size than the starch granules of hard and soft wheat, rye and approximate those of American corn in shape. All of said discrete starch granules are well within the "sub-sieve" size zone and cannot be depleted of the light bran fragments or of the very numerous protein shreds and fiber by any of the known sifting or screening methods of the prior art. By "sub-sieve" size we mean a particle size which will readily pass through the test laboratory sieve of W. S. Tyler Company having 325 meshes to the linear inch. The bran fragments and fibers of milo and the like are not substantially removed from the flour stock by repeated grinding and sifting of the prior art. Consequently, the milo products sold today for industrial use have relatively high fat contents often exceeding 3%, high fiber content exceeding 2½%, rather dull color and seldom have a protein content less than the orignial grain from which derived.

We have discovered that by efficiently air separating the ground milo or sorghum within a newly discovered range of critical cut, the fines including substantially all discrete protein shreds, fibers and bran fragments and a large proportion of the fat-bearing matter may be readily removed from the ground milo flour by one or two air classification steps, whereafter the larger agglomerates of starch adhered to protein matter and bran flakes may be removed either by economical sieve operations using bolting cloth in a range of from 12XX to 16XX, or more expensively may be removed by air separation within a much higher critical cut range than that used for depleting protein shreds, bran fragments and the fibers.

Something which is peculiarly characteristic of milo and the like is that because of the large amount of lipids and other fats carried or inherent in the protein shreds, when these natural ingredients are removed from the flour at the start of the process, then the flow and handling characteristics of the remaining discrete starch granules and agglomerates are so improved that an excellent classification may be made with simple sifting by bolting cloths in a range of 12XX to 16XX to deplete the treated material of bran and the larger agglomerates of starch with protein.

Hereafter, where we employ the term "milo" we mean to include the other cereal grains of the sorghum genus. Regardless of the particular grinding process employed on milo, the flour produced is made up of heterogeneous particles, some of which consist principally of starch and others of which consist principally of shreds composed mainly of protein, and others of which consist in chunks or agglomerates with starch granules adhered to protein matrix or protein matter.

The main object of the present invention is to obtain from milo either starting with the whole grain or starting with the commercially milled milo flour, a substantially uniform, low-protein product consisting principally in the discrete milo starch granules and depleted of protein shreds, fiber and larger agglomerates of starch granules and protein matrix.

Another important object is to provide a simple, two-step classification process for ground sorghum genus cereals, to separate and concentrate the industrially useful starch granules and to exclude undesirable other constituents, namely the proteinaceous matter, germ fragments, bran fragments, including the enzyme-rich aelurone fragments, and the waxy epidermis fragments of the milo or other sorghum cereal.

Particle size determinations were made by the centrifuge sedimentation method fully explained in the appendix of our co-pending applications which for particle sizes from 1 to 32 F–D (fluid dynamic) units are approximate with the particle size determinations described by K. T. Whitby (Heating, Piping & Air Conditioning, pp. 1–7, January 1955, and pp. 139–145, June 1955). In this application we will therefore refer to a "nominal" micron particle size as determined by rate of sedimentation. Spherical particles are the indexing medium as in the Stokes law but many particles larger than 20 linear microns in major absolute dimensions will frequently appear in the less than 20 nominal micron category if irregularly shaped to settle more slowly than a sphere of equal density.

The foregoing recited objects and advantages of our invention will more fully appear in the following description, made in connection with the accompanying drawings, wherein like reference characters refer to similar parts throughout the several views and in which:

FIG. 1 is a plan view on a magnified scale (approximately 180 times) showing typical heterogeneous particles of fine ground milo flour commercially milled, having a protein content for example of 8.29 and a Fisher value of 13.5, and having been drawn from micro photographs of actual commercial milo flour;

FIG. 2A is a similar view on a similar magnification (180 times) showing the fines removed from the parent flour by highly efficient air separation at our discovered essential range of critical cut;

FIG. 2B is a similar view of a portion of the particles of FIG. 2A highly magnified to a power of 770 times;

FIG. 3 is a similar view magnified 180 times showing the desirable low protein (high starch concentrate) obtained as a premium product by our improved methods;

FIG. 4 is a similar view under 180 times magnification of the coarsest fraction separated off at a critical cut or cuts during the last step or steps of our method and having a protein content as high or usually slightly higher than the original parent stock; and FIG. 5 is a diagrammatic flow sheet showing an example of conditioning, treatment, grinding and fractionation of a whole grain milo cereal embodying our invention and also, showing below the broken line L—L an alternative example of critical classification by purely air separation of the larger and coarser fraction obtained from a first air classification of a commercially milled milo flour.

Referring now to the selected examples of our methods illustrated in the flow sheet FIG. 5, a source of whole cereal, soft milo M is fed downwardly to the first treatment apparatus which preferably includes a separator aspirator for removal of foreign matter and then to a steam treatment chamber with steam or hot vapor dispersed into the cereal grains to raise the temperature thereof roughly to approximately 142° F. The grain is discharged from the steam chamber to a large bin B where the milo cereal is in slow travel for approximately 17 hours and where moisture approximately 20% is maintained at a temperature of about 130° F. during such time. From this stage the conditioned grain travels as shown to "cleaning" apparatus A which optionally may be selected from scourers, hullers, decorticating apparatus or brushes. From this cleaning apparatus, the grain still in whole state is moved to a suitable cooler and is cooled to a temperature approximately 80° F. From this stage the whole grain is moved into the delivery end of a screw conveyor SC in which moisture is added at the rate of 2 to 5% of the grain and to toughen the branny layers. The screw conveyor delivers to a hopper or bin X where the holding time is predetermined for approximately 20 minutes. Thereafter the moistened whole milo grain enters an efficient intensive grinder G of any of the types hereafter identified (or the equivalent) and is ground preferably in a manner to minimize shearing of particles and starch damage, the ground material discharged from the grinder having a Fisher value in about the range of 17 to 24 units.

This intensely ground milo flour produced constitutes a great mixture of heterogeneous particles varying widely in size between 2 microns and 500 microns, a portion of said particles constituting fines and comprising for the most part fine protein shreds and immature, small starch granules and damaged or fractured starch granules and bran fragments. A second portion of said mixture of heterogeneous particles consists in discrete larger starch granules having flow dynamic characteristics between about 12 microns and 32 microns (nominal). Another portion of said particles is preponderantly made up of large and small agglomerates usually consisting of a plurality of starch granules adhered together by a protein matrix or matter.

The said milo flour from grinder G passes in preferably continuing flow to a highly efficient air classifier C which may be any one of a number of commercially proven air classifiers hereinafter identified (or the equivalent thereof) and which classifier is adjusted for a critical cut of between about 13 to 15 microns (nominal) as shown in FIG. 5. In this air fractionation step at the critical cut we have discovered, substantially all of the protein shreds, the fragments of bran, the minute starch granules and immature or pieces of broken starch granules are pulled off in the fine stream to be suspended in one stream of the general air current within the classifier, constituting a small fraction approximating about 8% by weight of the original milo grain in whole form and having a protein of about 11.16% and having a Fisher value approximating 6½ units. The fat content of this fraction approximates 5 and the ash 2.9. This material may be fed to a mill feed stream and contains practically all the bran and bran fragments in the ground flour, substantially all of the discrete protein shreds and a large part of the lipids and fats originally contained in the cereal grain. It also contains the greatest part of the fiber.

We have discovered that when said discrete protein sheds, fiber, bran fragments and minute starch granules and fragments of broken starch granules are efficiently removed from the flour, unexpectedly a low cost and very simple classification of the remaining coarse fraction at a cut roughly approximating the lower range of the sieve size can be made by ordinary sifting operations (gyro or otherwise) with the use of bolting cloth or equivalent sifters having a range from 12XX to 16XX. Thus because of the better flow and handling characteristics of the coarse fraction depleted of the said substances in the fine fraction produced by classifier C, a sharp separation at slightly over the lower end of the sieve size, particles will be made in the sifter S which shows a first screen of 50W and a lower screen of 12XX bolting cloth. The overs from the 12XX screen comprise preponderantly the large agglomerates or chunks with starch granules adhered to protein matrix or matter, mostly being greater than about 35 microns (nominal), which in the example shown constituted by weight about 32% of the weight of the original whole grain.

The simple and inexpensively operated sifter with the 12XX to 16XX sifter cloth performs a sharp classification on the particular material fed to it as specified close to a cut of about 35 microns and slightly above, the fines passing through said sifting cloth constituting in the example shown approximately 60% by weight of the total weight of the whole cereal provided. As shown in the flow diagram, the finer fraction has a substantially reduced protein content of 6%; an ash content of 1.1, a fat content of 2.6%, a fiber content of .67%, and a Fisher value approximating 17.3 units.

To show the particle distribution, shapes and sizes of the various heterogeneous particles of the milo flour produced and the subsequent fractions thereof, reference is made to FIGS. 1 to 4 inclusive of the drawings, all of which were accurately made by a skilled draftsman from micro photographs taken of the actual ground flour and the fractions thereof previously described. FIG. 1 shows the flour stock having been intensely ground to a Fisher value at about 19.8 units. The largest and glossy particles indicated as (a) constitute endosperm chunks or large agglomerates of many starch granules bonded together by adhering protein matrix or matter. These may have many and varied shapes and sizes and must be removed from the stock ultimately to produce the highly improved low protein milo endosperm product. The protein content is substantially the same or slightly higher than the protein content of the whole milo grain, in the example shown being slightly over 8%. In FIG. 1 many discrete starch granules of poly hedral shape varying substantially in size are indicated by the letter (s). These frequently have central indentations and are generally similar to American corn starch granules. There are also a number of smaller agglomerates (a) where sometimes only two or three starch granules are adhered by protein matter. Also, in FIG. 1 discrete protein shreds (p) frequently appear and tiny specks of bran fragments (b) are present.

FIG. 2A shows at a magnification of 180 times, the very fine fraction taken off of the intensely ground flour in the small volume fine stream separated by the classifier C at a critical cut between 13 and 15 microns. The particles can better be distinguished in FIG. 2B which is from the same material of FIG. 2A but enlarged 770 times. Here, a substantial amount of irregularly and jaggedly shaped protein shreds (p) are present with a large number of minute starch granules and fragments of starch granules (s) and a few very small agglomerates (a) of one or more small starch granules with protein matrix. Numerically it will be seen that there are a very large number of the protein shreds (p) with a number of specks (b) which constitute bran fragments.

In FIG. 3 the desirable new premium product, comprising to a very large extent discrete large or full size starch granules (s) of poly hedral shape are shown. No discrete protein shreds can be found nor any specks indicating presence of bran fragments. The improved fraction comprises mainly said discrete starch granules with some smaller agglomerates of two or more starch granules such as indicated by (a) bonded together by adhering protein. It is noticeable that the proportion of adhering protein is much lower there (FIG. 3) than in the large agglomerates shown in FIG. 4 where the starch granules are completely encased by protein matter.

In FIG. 4 the particle distribution at 180 magnification of the very coarse fraction or "overs" removed by the sifting step S is shown. Here it will be noted that almost all of the particles shown are of relatively very large size and constitute agglomerates of a plurality and sometimes a great multiplicity of starch granules adhered together by protein matter. A few very large discrete starch granules (s) are also found in said coarest fraction.

We have described now a complete process illustrated in FIG. 5 starting with the source of whole cereal milo M through the conditioning and cleaning or scouring stages, the moistening stage just preparatory to grinding, the grinding stage through grinder G, the low cut air classification step or stage through classifier C and the coarse separation stage S after removal of the very fine high protein fraction including protein shreds, fibers, minute starch granules, broken starch granules and bran fragments. The last step of the process previously described comprises the low cost sifting step employing bolting cloth or the equivalent in a range from 12XX to 16XX.

A second alternative method is shown below the broken line L—L disposed below the grinder G in FIG. 5. Flour produced from the grinder as previously described, may be first classified in air separator C under the conditions previously described. Then, as shown in the dotted lines, the coarser fraction from the classifier C may be fed into an efficient air separator C-2 adjusted for a critical cut within the range of between 24 and 35 microns (nominal) depending upon the nature of the of the particular sorghum stock or milo utilized. The air separator C-2 pulls out a large volume finer fraction wherein the particles have flow dynamic characteristics ranging from 13 to the most 35 microns which predominantly are discrete starch granules as shown in FIG. 3 of the drawings with depletion of protein shreds, fiber material, large agglomerates and bran fragments. The quantity of this fraction with the air classification step carried out by air separator C-2 in the most instances, will yield slightly less percentage by weight of the new purified low protein product as contrasted with the method first described, but usually will have a reduction of protein content slightly greater than the protein content of the improved product where the sifting step is employed for final classification.

The alternate apparatus and steps shown below the broken line L—L of FIG. 5 may be employed to very efficiently classify and treat a commercially milled sorghum genus flour such as milo, in which case the hopper or chamber H receives continuously from an intensely milled milo flour source, conveying such flour to the classifier C by way of the dotted line Z, whereafter efficient air separation at the same critical cut is effected by air separator C, the fine fraction going to mill feed stocks or the like through the same channel common to the first method. The coarser fraction from air separator C is fed by communication line Y to the alternate air separator C-2 which operates as previously described. Alternatively the coarser fraction from classifier C may be directed through the full line indicated to the sifter separation step or apparatus indicated as S.

Our experiments have proven that the yield of the premium sorghum genus flour product of concentrated starch and low protein characteristics may be substantially increased from the same whole grain or commercially milled milo flour, whichever is employed as the starting material, by taking the extremely coarse fraction consisting predominantly in very large agglomerates and regrinding the same by efficient grinding steps, and then air classifying the newly ground flour in the same ranges or cuts herein identified.

We have also found that in instances it is desirable to add moisture to the stream of flour products (of coarser nature) produced by the air classifier C of the diagram, increasing moisture content of the material introduced into the sifter step S by approximately 4%. We have also discovered that in instances where the final improved product is made from a relatively dry material having high water retention characteristics, additional moisture up to 4% should be added to the end product before packaging or shipment thereof.

Where a grinding step or steps are employed in any of the processes disclosed herein, any satisfactory flour grinding mill which will grind to essentially a cake flour fineness may be utilized but it is preferable to use grinders which will have a minimum shearing and starch injury characteristic. We have found that such grinding mills are as disclosed in the Lykken et al. Patent No. 2,497,008 and in the recent Kosa Patent No. 3,067,959, are thoroughly effective. We also find that efficient hammermill grinders such as are disclosed in Sheldon Patent No. 2,552,596 are very satisfactory.

"Pin mill" type grinders such as that disclosed in Patent No. 2,651,470 as well as the "Contromill" grinders disclosed in Patent No. 2,928,616 give excellent results.

As to efficient air separators capable of making the necessary critical cuts for carrying out the steps of our methods, the classifier disclosed in Lykken et al. Patent No. 2,762,572 is highly satisfactory. Also, the air separator disclosed in the patent to Rumpf et al., No. 2,694,492 is well adapted for the critical separation work of our invention.

EXAMPLES

Example 1 constitutes the process diagrammatically illustrated in full lines in FIG. 5 and previously described in this specification. The source of materials is soft milo whole grain, first treated by a separator-aspirator or the equivalent for removal of foreign material and then steam treated to raise the temperature and moisture of the cereal grains to a point where, when they are discharged from the steam chamber to a holding bin the temperature roughly approximates 142° F. Further treatment of the whole grain containing moisture approximating 20% is maintained at a temperature of about 130° F.

during the desired treatment time of roughly 17 hours. Thereafter, preferably but not necessarily, a cleaning step is employed on the whole grain and from there, the grain is moved to a suitable cooler and cooled to a temperature approximating 80° F. The grain is then remoistened such as by its passage through a nozzle-provided screw conveyor chamber where moisture is added at a rate of about 2 to 5% to the grain to toughen the branny layers. The conditioned grain is then held for approximately 20 minutes in a hopper or bin and thereafter, enters an efficient intensive grinder G of the types described herein.

Preferably the grinding is such as to minimize shearing of particles and starch damage. The output of the grinder consists in ground material having a Fisher value in about the range of 17 to 24 units, with a fineness and particle size distribution comparable to cake flour. The ground flour then was subjected to a highly efficient air separation step of the performance equal to the air classifiers identified herein and at a critical cut of between 13 and 15 nominal microns. By this air separation substantially all protein shreds, bran fragments, minute starch granules and broken or immature starch granules are pulled off in the fine stream of the classifier, constituting approximately only 8% by weight of the original grain and with a protein of about 11.16%, and with fat content approximating about 5% and with ash at 2.9. The coarse fraction obtained through said air classification in this example was fed to a sifting operation which shows a first screen of 50 wires and a lower screen of 12XX bolting cloth. The larger and finer fraction or "throughs" from the sieving operation produced a premium concentrated starch and low-protein fraction approximating 60% by weight of the total weight of the whole cereal provided, and having a low protein content of 6%, an ash content of 1.1, a reduced fat content of 2.6%, a fiber content of only .67%, and a Fisher value approximating 17.2 units. The Stormer viscosity value of this product was excellent as compared to the flour produced from the grinding step.

Example 2 shows a coarse milo flour having a 26.0 Fisher value and an 8.23% protein content was turbo-ground to yield a Fisher value of 15.4.

Subsequent five-step air classifications produced six fractions, the medium size drawn off and ranging from 17 nominal microns to 46 nominal microns was reconstituted or blended into a fraction constituting by weight, 28.8% of the weight of the parent flour and having a very low 5.41% protein content.

The five-step fractionation producing said six fractions were made at 17, 25.5, 33, 36, and 46 nominal micron cut sizes respectively. In the first and low cut air classification at 17 microns the fines were withdrawn which included discrete protein shreds, bran fragments, very small whole starch granules and fractions of broken starch granules as well as fiber material and fragments of the germ. The larger and coarser fraction was thereafter successively subjected to the critical air classification cuts in air separators at said 25.5, 33, 36 and 46 nominal micron sizes to withdraw the larger and finer fraction in each instance, such fractions when blended constituting our valuable new product. The coarse fraction removed in said last air classification steps contained the larger agglomerates consisting in a multiplicity of starch granules encased in protein matter.

The grinder used in the procedure was a "Turbo" grinder (Pillsbury) numbered 508 of the vertical down-draft type. The air classifier used was the Turbo laboratory size air classifier numbered 526.

The respective Stormer viscosities of the parent flour, ground stock and the six fractions were respectively as follows:

| Parent | Ground Stock | First Fraction | Second Fraction | Third Fraction | Fourth Fraction | Fifth Fraction | Sixth Fraction |
|--------|--------------|----------------|-----------------|----------------|-----------------|----------------|----------------|
| 9.15 | 12.4 | 6.2 | 25.0 | 1.10 | 110.6 | 34.8 | 8.8 |

The very fine material having the Stormer viscosity of 6.2 was discarded and is well adapted for mill feed stock. The materials having the viscosities 25.0, 110, 110.6 and 34.8 represented the finest fractions of our new premium product and from these blends, we were able to obtain varying viscosities all the way from a low of 25.0 up to 110.6, making available a wide variety of starch concentration, low protein milo product for various valuable industrial uses.

What is claimed is:

1. The commercial process of producing a low-protein, high-starch, new flour product from sorghum genus grain which contains heterogeneous particles including a portion constituting discrete protein shreds, a portion constituting free starch granules and a portion constituting agglomerates of starch granules adhered to protein matter, comprising those method steps which consist in first subjecting the said flour in an air current at a critical cut between 13 and 15 microns (nominal) with the fine fraction including protein shreds suspended in one stream of said current and the coarse fraction in another stream of said current and collecting the coarse fraction, and then subjecting the coarse fraction to an air current and fractionating the same at a cut between 25 and 35 microns (nominal) to remove from said last mentioned coarse fraction the larger particles constituting mainly large agglomerates of starch granules adhered to protein matter, and collecting the fine fraction from said last air separation which comprises for the most part volumetrically, discrete larger starch granules of the sorghum genus flour, having a protein content at least 1½% below that of the original grain, and having a Fisher value between 12 and 19, and having less fat and fiber content than the original parent flour.

2. The commercial flour milling process for producing a low-protein, high-starch flour product from sorghum genus grain, comprising the steps of conditioning the raw whole cereal by the application of moisture and a sufficient quantity of heat for a period of time sufficient to inhibit some of the diastatic activity, adding moisture to the grain so treated to toughen the bran shortly before grinding, then grinding said conditioned grain to an extent where the Fisher value will be within a range of 17 to 24 units, then air separating the ground grain to remove therefrom the particles below about 15 microns (nominal), said removed particles containing substantially all of the discrete protein shreds, broken or damaged minute starch granules, and fragments of bran, then subjecting the coarse fraction consisting of particles having flow dynamic characteristics above about 15 microns (nominal) to a separating step at approximately 35 microns (nominal) to remove the larger particles consisting principally of agglomerates of starch granules adhered with protein matter, leaving a yield of in excess of 40% by weight of the original grain stock in the form of principally larger starch granules of quite similar size and polyhedral shape free of protein shreds and bran fragments, and having a lower protein content than the original starting grain, and having a fat content lower than the original grain.

3. The commercial process of producing a low-protein, high-starch new flour product from sorghum genus grain, comprising the steps of efficiently air separating a parent sorghum flour ground to a Fisher value between 17 and 24 units at a critical cut in the range of between 13 and 15 microns (nominal) to separate from the parent flour the particles below said micron range and which consist of discrete protein shreds, bran fragments and the smaller and damaged starch granules in the lower half of the sub-sieve size range, then subjecting the larger size particles from said air separation step to a sifting process in a sieve size range of 12XX to 16XX to efficiently separate and remove as "overs" substantially all of the larger agglomerates of starch granules adhered to protein matter, leaving a premium end product, consisting essentially of discrete, larger starch granules of the grain, having a protein content at least 1½% lower than the parent stock, and having a Fisher value between 12 and 19.

4. The process of claim 2 wherein the grain is milo.

5. The process of claim 3 wherein the grain is milo.

6. The combination and sequence of method steps set forth in preceding claim 2 wherein the last mentioned separating step is carried out at a cut approximating the upper limit of subsieve size range.

7. The combination of method steps set forth in preceding claim 2, further characterized by carrying out the last separation step through sieve separation by bolting cloth having a range in mesh of from 12XX to 16XX which in sorghum genus flours will remove into the overs those particles having flow dynamic characteristics predominately in excess of 35 microns (nominal).

8. The process of claim 7 wherein the grain is milo.

References Cited by the Examiner
UNITED STATES PATENTS 2,941,730   6/1960   Mertz et al.

OTHER REFERENCES

Cereal Chemistry: vol. 24 (1947), pages 381–388 relied upon.

Cereal Chemistry: vol. 25 (1948), pages 155–167 relied upon.

Matz: "The Chemistry and Technology of Cereals as Food and Feed," Avi Publ. Co., Inc., Westport, Conn., 1959, page 135, lines 3 to 12 being relied upon.

A. LOUIS MONACELL, *Primary Examiner.*

RAYMOND N. JONES, WILLIAM B. KNIGHT,
*Examiners.*